United States Patent [19]

Stüben et al.

[11] 4,396,564

[45] * Aug. 2, 1983

[54] METHOD OF PRODUCING TABLETS IN A PRESS AND A TABLET PRESS FOR CARRYING OUT THE METHOD

[75] Inventors: Werner Stüben, Büchen; Jürgen Hinzpeter, Schwarzenbek; Rudolf Deusch, Schwarzenbek; Konrad Friedrichs, Schwarzenbek, all of Fed. Rep. of Germany

[73] Assignee: Wilhelm Fette GmbH, Schwarzenbeck, Fed. Rep. of Germany

[ * ] Notice: The portion of the term of this patent subsequent to Jul. 6, 1999, has been disclaimed.

[21] Appl. No.: 210,762

[22] Filed: Nov. 26, 1980

Related U.S. Application Data

[63] Continuation of Ser. No. 962,895, Nov. 22, 1978, abandoned, which is a continuation-in-part of Ser. No. 943,921, Sep. 20, 1978, Pat. No. 4,238,431.

[30] Foreign Application Priority Data

Sep. 22, 1977 [DE] Fed. Rep. of Germany ....... 2742572

[51] Int. Cl.[3] .............................................. B29C 3/06

[52] U.S. Cl. ................................ 264/40.5; 264/40.7; 264/109; 425/147; 425/149

[58] Field of Search .................... 264/40.1, 40.5, 40.7, 264/109; 425/147, 149

[56] References Cited

U.S. PATENT DOCUMENTS

| | | | |
|---|---|---|---|
| 2,921,339 | 1/1960 | Pitzer | 425/149 X |
| 3,255,716 | 6/1966 | Knoechel et al. | 264/40.4 |
| 3,734,663 | 5/1973 | Holm | 425/147 |
| 4,000,231 | 12/1976 | Peterson | 264/109 X |
| 4,030,868 | 6/1977 | Williams | 264/109 X |
| 4,062,914 | 12/1977 | Hinzpeter | 425/149 X |
| 4,238,431 | 12/1980 | Stüben et al. | 264/40.1 X |
| 4,253,811 | 3/1981 | Hinzpeter et al. | 425/149 |

*Primary Examiner*—Philip E. Anderson

*Attorney, Agent, or Firm*—Michael J. Striker

[57] ABSTRACT

A method of manufacturing tablets in a press having a rotary die plate cooperating with a filling device including a rotary filling wheel and a rotary dosing wheel arranged on top of the die plate, and a plurality of die plungers each projecting into an assigned die in the plate, and further including means for adjusting the vertical position of the plunger; the method comprising the steps of adjusting the rotational speeds of the filling and dosing wheels to a value at which minimum variations of compressing forces take place, comparing a predetermined range of variations of the compressing forces with the measured actual values and adjusting the weight of the tablets in process by readjusting the vertical position of the plunger in response to the ascertained difference, and thereafter readjusting the rotational speeds of the wheels to minimize the variations of the readjusted compressing forces.

3 Claims, 1 Drawing Figure

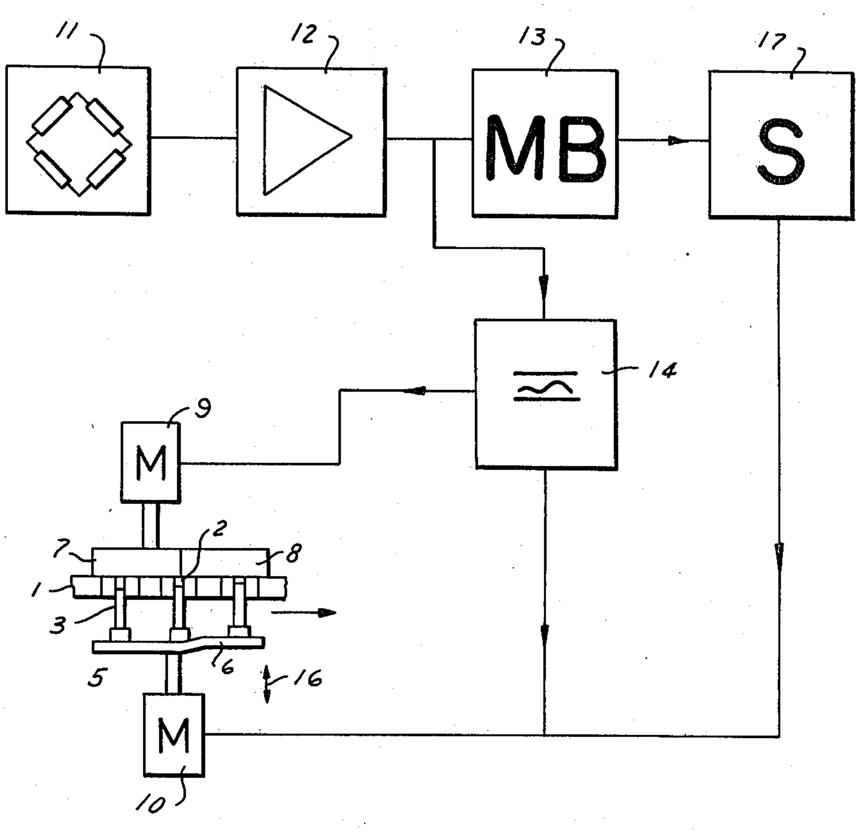
11
12
13
MB
17
S
14
9
M
2
7
8
1
3
5
6
16
M
10

METHOD OF PRODUCING TABLETS IN A PRESS AND A TABLET PRESS FOR CARRYING OUT THE METHOD

CROSS-REFERENCE TO RELATED APPLICATIONS

This is a Rule 60 continuation application of the application 962,895 filed Nov. 22, 1978 and now abandoned which in turn is a continuation-in-part of application Ser. No. 943,921 filed Sept. 20, 1978 now Pat. No. 4,238,431 issued Dec. 9, 1980 and entitled "Method of Producing Tablets in a Press and a Tablet Press for Carrying out the Method."

BACKGROUND OF THE INVENTION

The invention relates generally to a method of and a press for the production of tablets and more particularly the invention relates to a method in which loose material is fed into a tablet press having a charging device including a rotary filling wheel and rotary dosing wheel, means for adjusting the rotary speed of the wheels and a die plate including a plurality of dies each cooperating with a lower die plunger the vertical working position of which is adjustable by means of a dosing cam, and further including an electronic measuring device for measuring compressing forces applied on the loose material.

In the manufacture of tablets in a press, efforts are being made to insure that the tablets have uniform weight corresponding as close as possible to a predetermined standard weight and moreover that the manufacture of individual tablets takes place under the application of uniform forces corresponding to a preset nominal value as close as possible.

The compressing force applied to the tablet is among other factors of particular importance for the reason that it determines the dissolution time of the tablets or the disintegration of the latter. If, for example, the compressing force is too high, the tablet may dissolve only after it had left the stomach and entered the intestine. The effect of such a tablet is different from the effect of a tablet of the same weight that has been produced under a lower compressing force and that consequently dissolves faster than the former tablet.

Moreover, also the firmness of the tablet depends on the compressing force. Certain firmness or solidity of the tablet is necessary for a further processing, for example in dragee kettles and in packing. For example, if the compressing force is too low the tablet disintegrates already under a small load. If, however, the compressing force is too large the tablet can split into layers.

The weight of tablets depends also on the density of charge of the granulated or loose material in the die as well as on specific weight of the material. Moreover, the weights of the tablets depend on the degree of filling in the die or on the free volume left in the die when the latter is filled with the granulated or loose material introduced therein by the charging or filling device past which each die in the rotary die plate periodically moves. The amount of charge is determined by the position of the die plunger projecting into the die from below and moreover by the manner the filling of the die is carried out or by the speed of charging into the die.

In order to achieve a complete charge of a die during a fast rotation of the die plate, known tablet presses are equipped with a charging or filling wheel and with a dosing wheel, both wheels being driven for rotation in counter-direction relative to each other. Underneath the filling wheel is located a rail-like cam and underneath the dosing wheel is located an elevated rail-like dosing cam. The both cams can be united to form a one-piece rail that is vertically adjustable (German publication No. 22 51 832). The two rails of course can remain as two separate pieces so that the dosing cam is vertically adjustable relative to the filling cam.

In the manufacture of a tablet when the die moves past the filling device, the corresponding lower die plunger in the range of the filling wheel is held at a lower position by means of the filling cam and in the subsequent range below the dosing wheel is raised by running up on the dosing cam. Accordingly as soon as the filling wheel in the first-mentioned range charges the loose tablet material in the die, in the subsequent second range the charged material is lifted in the die by the action of the lower die plunger and a portion thereof is discharged upwardly and wiped off the upper surface of the die plate by the dosing wheel. In this manner it is insured that each die receives a complete filling. It has been found, however, particularly in the case of fast rotary tablet presses, that the bulk weight or bulk density of the charge material varies within a certain range when the rate of rotation of the filling and dosing wheels as well as of the die plate, is changed. At different rates of rotation of the filling wheel there will result different amounts of the charge and thus of the weight of the charge. The weights of respective charges depend, therefore, on the adjustable rate of rotation both of the filling wheel and the dosing wheel (both having usually a uniform rotary speed), and on the vertical position of the lower die plungers set by vertical adjustment both of the filling and dosing cams or exclusively by the vertical adjustment of the dosing cam.

From the German publication 22 51 832 it is known how to compare an actual value of the measured compressing force with a nominal value thereof and how to adjust in response to the ascertained difference the weight of the tablet by adjusting vertically the dosing cam. It is true that by such vertical adjustment of the dosing cam the weight of tablets can be more effectively influenced then by changing the rate of rotation of the filling wheel. Different rates of rotation of the filling wheel, however, still have a considerable influence on the weight inasmuch as at certain speeds of the filling wheel considerable weight variations may occur among consecutively manufactured tablets whereas uniform tablet weights are obtained in a very narrow range of rotary speeds of the filling wheel. It is, therefore, advantageous to make use of those rotary speeds of the filling wheel which produce lowest variations of the charge weight. The optimum rotational speeds, however, are again dependent on the size of the die or on the position of the lower die plunger.

In the aforementioned known method of regulating the weight of tablets by regulating the compressing forces there is first computed from a succession of compressing forces a mean or average value that is compared with predetermined nominal limits and in the case when the measured forces exceed those limits the machine is stopped. This known kind of control, however, does not have proved to be completely satisfactory. For example, if three consecutively measured values 10, 11 and 12 are combined into the mean value 11 and if the nominal limits are set to be 10 and 12 so both the mean value and also all individual components lie within the predetermined limits. If, however, under different circumstances values 1, 11 and 21 are measured, there also results a mean value 11 lying between the set limits in spite of the fact that two of the three measured individual values widely exceed the permissible limits. This known method does not, therefore, take into account larger variations of compressing forces and these variations cannot be recognized from the resulting mean value. On the other hand, if in the known method an undesirable deviation between the actual value and the nominal value of the measured forces is ascertained, an automatic regulation or a manual vertical adjustment of the lower die plunger or of the dosing cam will follow. During this action variations of compressing forces and thus variations of tablet weight resulting from each change of rotary speed of the filling wheel could not or had not been taken into account. Besides, variations of the mean value of compressing forces can be compensated only with a time delay so that the range of variations of individual compressing forces cannot be substantially influenced by employing the above-described prior art method.

SUMMARY OF THE INVENTION

It is, therefore, a general object of the present invention to overcome the aforementioned disadvantages.

More particularly, it is an object of the invention to provide an improved method of producing tablets having uniform weights which correspond as close as possible to a predetermined nominal weight.

Another object of this invention is to provide a method of manufacturing tablets in a press in which all tablets are subject to a uniform or substantially uniform compressing forces.

In keeping with these objects, and others which will become apparent hereafter, one feature of the invention resides, in a method of manufacturing tablets in a press, in the steps of automatically adjusting by means of an electronic control device the speed of rotation of the filling wheel and of the dosing wheel of the press in response to the measured compressing forces applied on the tablet, to a value at which minimum variations of the compressing forces take place, comparing in a suitable known manner the actual value of the measured compressing forces with nominal limits and in response to the ascertained difference vertically adjusting the dosing cam and the position of lower die plunger resulting in the adjustment of the weight of the tablets, and thereafter readjusting the rotary speed of the filling and dosing wheels in response to the measured readjusted compressing forces.

By means of this novel method the aforedescribed disadvantages are avoided since due to the adjustment of the rotary speed of the filling wheel variations of compressing forces are substantially eliminated also in the range in which the nominal mean value of compressing forces coincides substantially with the actual mean value. The improved effect takes place particularly in the case when the method of this invention is repeated at least in periodic time intervals and the compressing forces are continuously monitored. The monitoring of compressing forces is effected by continuously comparing individual compressing forces or a mean value formed of these individual compressing forces or a statistic value such as a relative standard deviation, with permitted limit values and by minimizing the ascertained differences by suitably adjusting the speed of rotation of the filling wheel and, in addition, by comparing the weight of resulting tablets through the comparison of the mean value of compressing forces reflecting an actual weight of the tablets, with a nominal value and by vertically adjusting the dosing cam in response to the ascertained deviations.

In practical operation the method of this invention can be employed in such a manner that at a certain vertical position of the dosing cam and a predetermined speed of rotation of the die plate the speed of rotation of the filling wheel is being changed until minimum variations of the successively measured compressing forces are achieved. In this manner, the uniformity of compressing forces and consequently the uniformity of the weight of the tablets, is optimized. The weight of the tablets may, however, still deviate from the prescribed nominal weight. After the comparison, the vertical position of the dosing cam is, therefore readjusted. This readjustment may cause still another increase in the range of deviations of individual compressing forces and this increase is again minimized by changing the rotational speed of the filling wheel. Since due to the repeated readjustments of the filling device the quantity of charge and consequently the weight of the charge is also slightly changed, the method of this invention is preferably carried out in such a way that individual method steps are alternately executed in a repeated succession. This repetitive alternation is of advantage when in the course of operation of the tablet press the composition of the loose tablet material changes, for example, due to different distribution of sizes of granular or loose tablet material.

With preference the method of this invention is carried out in such a manner that after reaching the nominal value the speed of rotation of filling and dosing wheels is stepwise changed in response to the measured compressing forces until minimum variations of the compressing forces are attained. The individual steps are thereby applied in the same order until minimum deviations of the compressing forces take place and when the minimum is exceeded, the direction of the consecutive method steps is reversed.

In practical operation expenditures for the use of the method of this invention are relatively small since the existing electronic switching and controlling devices are supplemented by a relatively small number of electronic logic modules. The resulting combination of the measuring device with the tablet press is characterized by combining the conventional electric measuring device for measuring compressing forces with a unit for forming an average or mean value of the measured compressing forces and in addition in providing a control part connected for controlling the driving mechanism for the filling wheel and also being with advantage connected to the vertical adjustment mechanism for the dosing cam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates schematically filling and dosing means for a tablet press cooperating with a measuring device for performing the method of this invention.

DESCRIPTION OF THE PREFERRED EMBODIMENTS

The measuring device as shown schematically in the drawing is designed for use in connection with a rotary, tablet forming press having a rotary die plate 1. Die plate 1 defines a plurality of dies 2 each being provided with a lower die plunger 3 projecting into the die from below. In the filling range of the tablet press the lower die plungers 3 contact a filling cam 5 forming a first section of a rail-shaped cam, whereas the second section of the latter is formed as a dosing cam 6. The dosing cam 6 extends a little higher than the filling cam 5.

Filling wheel 7 is rotatably arranged in the range of the filling cam 5 and above the die plate 1 and in the range of the dosing cam 6 and above the corresponding portion of the die plate 1 is rotatably arranged the dosing wheel 8. In this embodiment, the speed of rotation of the filling wheel 7 and of the dosing wheel 8 is controlled by an electromotor 9 having adjustable speed.

A second electromotor 10 is coupled in a known manner to the filling and dosing cams 5 and 6 to adjust vertical position of these cams relative to the die plate 1. For example, the vertical position of the cams 5 and 6 can be adjusted within the range of three millimeters as indicated by arrows 16, whereas the speed of rotation of the filling and dosing wheels 7 and 8 can be adjusted between 5 and 100 revolutions per minute.

The manufacture of tablets in which uniform compressing forces are applied on the loose tablet material to attain uniform weights of respective tablets corresponding to a prescribed nominal weight is based on the evaluation of the measured compressing forces which in turn determine the weight of the produced tablets.

In the operation of the tablet press, each die plunger station generates during a compressing action an electrical signal corresponding to the applied compressing force to be evaluated, the signal being generated in an electrical resistance strain measuring strips connected in bridge in a measuring unit 11. These signals are immediately and automatically processed in the electronic measuring device and applied for controlling both the rotational speed of the filling wheel 7 and the vertical position of the dosing cam 6. For this purpose the individual signals are amplified in an amplifier 12, fed to an average mean value generator 13 (MB) where a mean value of a predetermined sample of the signals is formed; the mean value can be compared with a preset range of mean values. Moreover, in a control unit 14 maxima and minima of individual measured signals corresponding to the actual compressing forces can be compared with a preset pair of limit values. The mean value can also be compared if desired in the control unit 14 with a preset pair of limits of the mean value, or a standard deviation can be computed and compared with the preset limits. The control unit 14 working as a comparator has its output connected to the adjustable driving motor 9 for controlling the speed of filling wheel 7 and also to the servomotor 10 for adjusting the vertical position of the dosing cam 6. The control circuit 14, therefore, controls in response to the measured deviation both the rotational speed of the filling wheel 7 and the vertical position of the lower die plunger 3 so that the volume of the die is regulated in response to the output of the comparator 14. The control unit or comparator 14 controls the vertical position of the dosing cam only in the case when it is known from previous experience that due to the adjustment of motor 9 a proportional adjustment of the dosing cam will follow.

An additional vertical adjustment of the dosing cam 6 is made in a conventional manner via a signal generator 17 in which the mean value of compressing forces formed in the mean value generator 13 is compared with a preset nominal mean value. If the deviation exceeds predetermined limits of this nominal mean value, the signal generator transmits an adjustment signal applied to the motor 10.

In the operation of the tablet press, the driving motor 9 for filling wheel 7 is controlled by the control comparator 14, after the die plate 1 has attained a predetermined rotary speed, in such a manner that the variations of measured individual compressing forces are minimized. To this end, control unit 14 ascertains the range of variations of individual compressing forces and thereafter follows the first adjustment step of transmitting a control pulse to the motor 9. Thereupon the control unit 14 repeats the determination of the corrected range of variations. If the new range of variations is larger than the previous one, the control unit 14 will generate two pulses in opposite sense so as to arrive from counter-direction to the minimum range. Thereafter the subsequent range is measured and compared and further control forces are generated and transmitted to the motor 9 until the minimum range is again exceeded and subsequently the direction of the controlling steps is again reversed.

The control arrangement can also be designed such that during the change of the direction of controlling steps it automatically reduces the magnitude of the incremental adjustment. A comparison of the resulting mean value of compressing forces with the preceding nominal value of those forces leads, however, only to the identification of an undesired deviation so that it is only found that the processed tablets do not correspond in weight to a prescribed standard. To obviate the above shortcoming, there follows an adjustment of the dosing cam 6 so that by changing the vertical position of the lower die plunger 3 free volume of the die will be changed so as to produce another weight of the tablet. Nonetheless, the new position of the lower die plunger necessitates the readjustment of the rotational speed of the filling wheel since the new position of the plunger might cause again larger variations in the individual compressing forces in the press. Consequently the execution of one method step leads to the necessity of employing the next method step whereby the time periods of effected steps may overlap each other.

It will be understood that each of the elements described above, or two or more together, may also find a useful application in other types of circuits and constructions differing from the types described above.

While the invention has been illustrated and described as embodied in a manufacturing method for use with tablet presses, it is not intended to be limited to the details shown, since various modifications and structural changes may be made without departing in any way from the spirit of the present invention.

What is claimed as new and desired to be protected by Letters Patent is set forth in the appended claims:

1. A method of manufacturing tablets in a press of the type having a rotary die plate defining a plurality of dies, each including a vertically adjustable die plunger located below said plate and movable into a respective die to form a tablet therein, a rotary filling wheel disposed above a portion of said die plate and a rotary dosing wheel disposed above another portion of said die plate, adjustable driving means operative for driving said filling and dosing wheels, a filling cam track cooperating with said plungers, a vertically adjustable dosing cam operatively connected to said plungers for adjusting the vertical position of said plungers in said dies, first electronic means for measuring individual compressing forces applied against the tablet material in said dies, and second electronic means for amplifying an output of said measuring means, the method comprising the steps of: measuring compressing forces acting on the tablet material in said dies to define deviations of the measured compressing forces from a preset nominal value; preliminary automatically adjusting the rotary speed of the filling and dosing wheels by means of an electronic control circuit connected to the adjustable driving means, in response to said deviations; applying the signals corresponding to values of said measured compressing forces to said electronic circuit wherein said signals are compared with a preset nominal value thereof to define a resulting difference therebetween; adjusting the vertical position of the dosing cam in response to said resulting difference to thereby readjust the weight of the tablets to be produced; thereafter measuring the compressing forces acting on the tablet material; and thereupon finally automatically adjusting the rotary speed of the filling and dosing wheels in response to the newly measured compressing forces to thereby continuously change the rotary speed of the filling and dosing wheels until the preset nominal value of the compressing forces will be reached.

2. A method as defined in claim 1, wherein the rotary speed of the filling wheel and of the dosing wheel is controlled in response to deviation from a predetermined range of variations of the compressing forces and independently from this regulation the dosing cam is controlled by a readjustment signal corresponding to the difference between the nominal value and the actual value of the compressing forces.

3. In a tablet manufacturing press of the type including a rotary die plate defining a plurality of dies each cooperating with a vertically adjustable die plunger, said plungers being located below said plate and movable into respective dies to form tablets therein, a filling device arranged above the die plate and including a rotary filling wheel and a rotary dosing wheel, driving means for adjusting the rotational speed of said filling wheel and said dosing wheel, respectively, a filling cam track cooperating with said plungers during filling of said dies with a tablet material, a vertically adjustable dosing cam cooperating with said plungers, adjustment drive means connected to said dosing cam and operable for adjusting the vertical position of said die plungers via said dosing cam, an electronic measuring device for measuring compressing forces and for forming a mean value of the measured forces, and an electronic amplifier which amplifies the output of said electronic measuring device, the combination comprising a control comparator operable for producing a control signal proportional to the deviation of measured compressing forces from a preset nominal value, said signal being applied to said driving means for adjusting the rotational speed of said filling and dosing wheels, said control comparator being operatively connected to said adjustment drive means to adjust the vertical position of said dosing cam upon receiving a control signal by said adjustment drive means from said control comparator.

* * * * *